United States Patent
Barnes (10) Patent No.: US 8,401,876 B1
(45) Date of Patent: Mar. 19, 2013

(54) SYSTEMS AND METHODS FOR SELECTING PROPER CLAUSE FOR DOCUMENT

(75) Inventor: Guy Lewis Barnes, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 851 days.

(21) Appl. No.: 12/105,359

(22) Filed: Apr. 18, 2008

(51) Int. Cl.
*G06Q 40/00* (2006.01)

(52) U.S. Cl. ............................................. 705/4; 705/30

(58) Field of Classification Search .................. 358/474; 705/3–44
See application file for complete search history.

(56) References Cited

U.S. PATENT DOCUMENTS

| | | | | |
|---|---|---|---|---|
| 4,876,648 | A * | 10/1989 | Lloyd | 705/38 |
| 7,107,241 | B1 * | 9/2006 | Pinto | 705/38 |
| 7,882,023 | B2 * | 2/2011 | Parrish | 705/38 |
| 2004/0117280 | A1 * | 6/2004 | Klee et al. | 705/35 |
| 2005/0144119 | A1 * | 6/2005 | Monsen et al. | 705/38 |
| 2007/0043658 | A1 * | 2/2007 | DiPaolo et al. | 705/38 |
| 2008/0091626 | A1 | 4/2008 | Kremen | |
| 2008/0144130 | A1 * | 6/2008 | Kerigan et al. | 358/474 |
| 2008/0243679 | A1 * | 10/2008 | McMurray et al. | 705/38 |
| 2010/0094744 | A1 | 4/2010 | Van Slyke et al. | |

OTHER PUBLICATIONS

Tradewinds "Processing Service" Retreived from the internet <URL: http://www.tradewindsonline.com/apps/tw/processinghtml.asp?title=Processing%20Services>.
Insurity—A ChoicePoint Company "Outsourcing Services: Hosting, Statistical Reporting and Insurance Processing" Retreived from the internet <URL: http://www.insurity.com/ie6_main.asp?cat=4>.
Reuters "ChoicePoint Inc CPS (NYSE)" Retreived from the internet <URL: http://stocks.us.reuters.com/stocks/fullDescription.asp?symbol=CPS>.
ISO—"ISO Acquires eLiens From Xtria to Automate Insurance Coverage Notifications to Lenders" Retreived from the internet <URL: http://www.iso.com/index.php?option=com_content&task=view&id=2216I>.
TCCS—Town and Country Computer Services, LLC—"INS PRO Interfaces" Retreived from the internet <URL: http://www.tccs-inspro.com/interfaces.html>.
EDS, Expertise, Answers, Results—"EDS*SEND® Electronic Notification Services" Retreived from the internet <URL:http://www.eds.com/services/edssend/>.

* cited by examiner

*Primary Examiner* — Frantzy Poinvil

(74) *Attorney, Agent, or Firm* — Brooks, Cameron & Huebsch, PLLC (57) ABSTRACT

An insurance company issues a property policy to a customer for property encumbered with an obligation to a creditor. The policy is to be issued to include an encumbrance clause as specified by the creditor. An identification of the creditor is provided to a clause database owned and maintained by a third party agent of the insurance company. The clause database determines that the identified creditor has an entry therein, retrieves from the entry the encumbrance clause as specified by the creditor, and returns the retrieved clause, which is received and inserted into the policy to be issued.

18 Claims, 6 Drawing Sheets

SYSTEMS AND METHODS FOR SELECTING PROPER CLAUSE FOR DOCUMENT

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 12/105,371; and
U.S. patent application Ser. No. 12/105,377.

FIELD

The present disclosure is directed to systems and methods that effectuate placement of an appropriate clause in a document. More particularly, the present disclosure is directed to such systems and methods that are applied to the context of an insurance policy, and specifically selecting an appropriate mortgage clause to be inserted into the insurance policy.

BACKGROUND

In a highly automated operation such as a large insurance company, documents are often issued as a combination of common text and inserted text. As may be understood, the common text is common to all forms of the issued document, while the inserted text varies in each form of the issued document according to factors relating to the particular circumstances of the issuance of each particular document.

For example, when issuing an insurance policy in connection with property, it is often the case that the property is or is to be encumbered with a mortgage or another obligation in connection with which the property has been pledged to secure the obligation. In such a case, the mortgagee oftentimes requires insertion of particular text into the issued insurance policy as a mortgage clause or the like, usually in a declarations page of the issued policy. As should be understood, the mortgage clause essentially states that the mortgagee is in fact a mortgagee with respect to the property and therefore has certain rights under the terms of the issued policy with respect to the property. In particular, the mortgage clause may have the correct legal name of the mortgagee, a designation that the mortgagee should be construed to include successors and/or assignees, a correct legal address of the mortgagee, an identification of the mortgage, and/or the like. Note here that such information may also be employed to directly bill the mortgagee for the cost of the policy or otherwise notify the mortgagee regarding the policy, if in fact such an arrangement has been made.

As should be understood, the insurance company issuing such a policy with such a mortgage clause with respect to the particular mortgagee may in fact issue many such policies with such mortgage clause with respect to the particular mortgagee, as well as many other policies with other mortgage clauses, each with respect to one of a number of particular mortgagee. Accordingly, it is known that the insurance company may maintain a mortgage clause database with multiple mortgage clauses, each for a particular mortgagee. With such a mortgage clause database, then, issuance of a policy for a particular piece of property with a mortgage thereon only requires identifying the mortgagee for such piece of property. Based on the identification, then, the insurance company does not necessarily contact the identified mortgagee, but instead refers to the mortgage clause database to determine whether the identified mortgagee has an entry therein. If so, a predefined mortgage clause for the mortgagee is retrieved from the entry and appropriately inserted as inserted text into the policy issued for the piece of property, and such clause may also be employed to directly bill the mortgagee for the cost of the policy or otherwise notify the mortgagee regarding the policy.

Note, though, that such a mortgage clause database of an insurance company is only useful to the insurance company if the clauses therein are correct. Thus, if the database contains an outdated clause, perhaps because the corresponding mortgagee has changed the corporate form thereof or the address thereof, then use of the outdated clause will eventually be noted by the mortgagee or an agent thereof, which in turn will require that the clause be corrected. As should be understood, such correction requires considerable time and effort, both in human terms and in terms of paperwork, postage, filing, and the like.

Note too that it may be the case that a particular mortgagee has multiple entries in the database, or that multiple entries in the database are ambiguous and may apply to the particular mortgagee. For example, it may be that a second entry was created for the particular mortgagee without deleting a first entry therefore, or it may be that one entry lists the mortgagee as a corporation while another entry lists the mortgagee as a partnership. In fact, it may be that the particular mortgagee has entries for each of several jurisdictions. In any case, and again, if the clause from the wrong entry is used, the wrong clause will eventually be noted by the mortgagee or an agent thereof, which in turn will require that the clause be corrected. Again, such correction requires considerable time and effort, both in human terms and in terms of paperwork, postage, filing, and the like.

Accordingly, a need exists for systems and methods for selecting the correct clause for a document, and specifically the correct mortgage clause to be inserted into an insurance policy. More particularly, a need exists for such systems and methods that select such correct clause from a database that is better maintained than the mortgage clause database as maintained by an insurance company. Even more particularly, a need exists for such systems and methods that select such correct clause from a mortgage clause database maintained by a third party that is better equipped to maintain same.

SUMMARY

The aforementioned needs are satisfied at least in part by a system and method performed by an insurance company for issuing a property policy of the insurance company to a customer for property of the customer. The property is encumbered with an obligation to a creditor in connection with which the property is pledged to secure the obligation, and the policy is to be issued to include an encumbrance clause as specified by the creditor.

In one embodiment, an identification of the creditor is provided to a clause database owned and maintained by a third party agent of the insurance company. The clause database determines that the identified creditor has an entry therein, retrieves from the entry the encumbrance clause as specified by the creditor, and returns the retrieved clause. The retrieved clause for the identified creditor is received from the clause database and inserted into the policy to be issued, and the policy is issued with the inserted encumbrance clause for the identified creditor to the customer. The third party agent of the insurance company is better able than the insurance company to maintain and keep current the clause database.

In another embodiment, contact information is received for an entity that is to select the encumbrance clause, and the policy is preliminarily issued to the customer without any encumbrance clause therein. Thereafter, a message is sent to the selecting entity by way of the received contact information. The message as sent to and received by the selecting entity directs same to a clause database where the selecting entity selects therefrom an entry having the encumbrance clause for the policy as specified by the creditor. The selected clause for the creditor is received from the clause database, the preliminarily issued policy is amended to include the received clause for the creditor, and the amended policy is subsequently issued with the included clause for the creditor to the customer.

In a variation of the another embodiment, the selecting entity is a settlement officer conducting a settlement in connection with the property who creates an entry in the clause database having an encumbrance clause for the policy for the creditor. The preliminarily issued policy is firstly amended to include the received clause for the creditor and the firstly amended policy is subsequently issued with the included clause for the creditor to the customer, and information is received from the creditor that the received clause in the firstly amended clause is incorrect. Thereafter, the firstly amended policy is secondly amended to include a corrected clause for the policy as specified by the creditor and the secondly amended policy is subsequently issued with the corrected clause as specified by the creditor to the customer. Here, the settlement officer created the encumbrance clause with supposedly correct information that was actually wrong but could not allow settlement to proceed without issuance of a policy for the property with the supposedly correct but actually wrong information.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
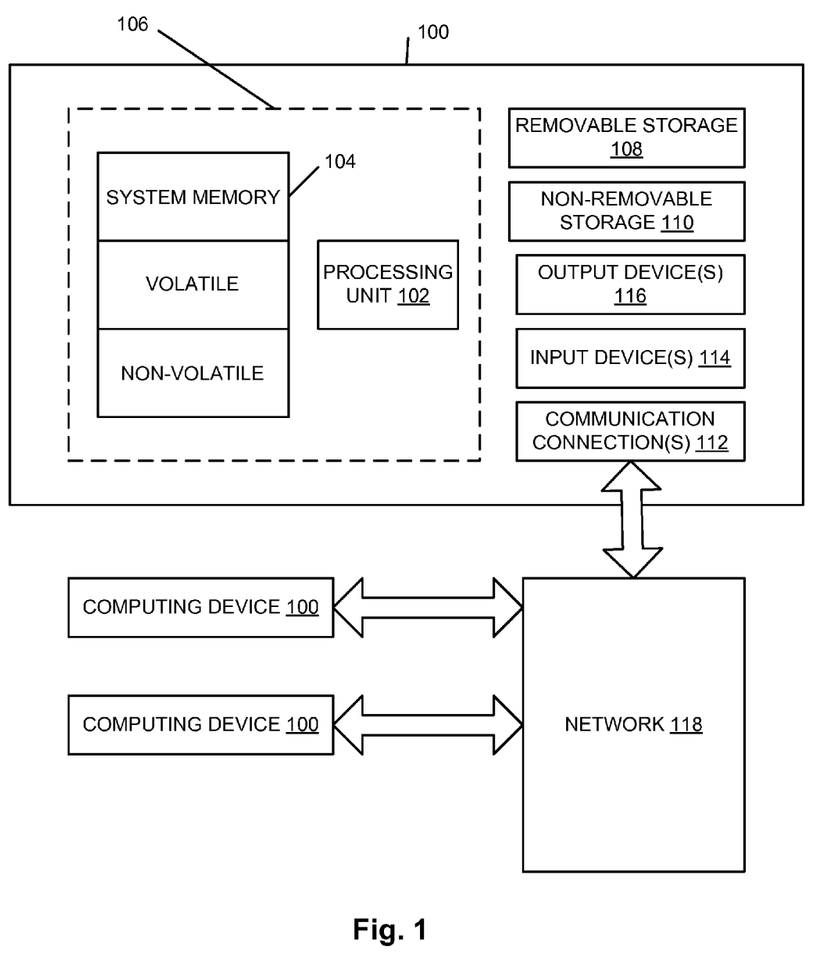
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Selecting a Mortgage Clause for an Insurance Policy

Figure 2:
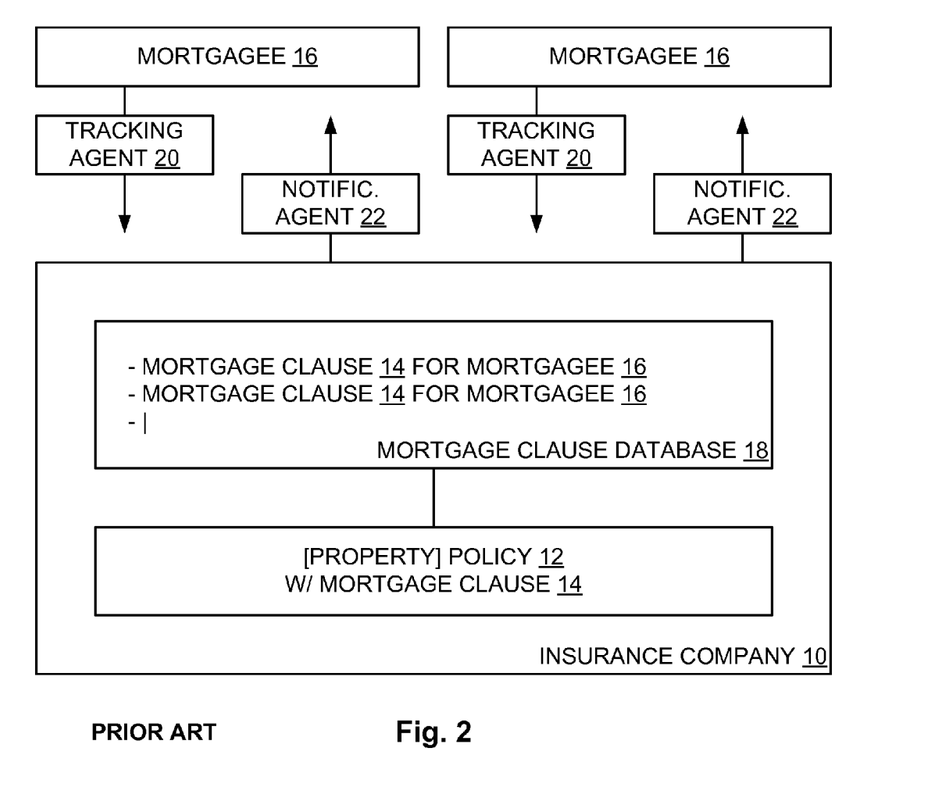
FIG. 2 is a block diagram of a prior art system for identifying a correct mortgage clause of a mortgagee for an insurance policy.

Turning now to FIG. 2, it is seen that an insurance company 10 may issue a number of policies 12, such as for example property insurance policies 12, where each policy 12 is memorialized as a document that includes common text and inserted text. As may be understood, the common text is common to all forms of the issued document, while the inserted text varies in each form of the issued document according to factors relating to the particular circumstances of the issuance of each particular document. For example, common text may include standard exclusion clauses, while inserted text may include clauses that vary based on jurisdiction, the named insured, the type of property being insured, etc.

One notable piece of inserted text is a mortgage or encumbrance clause 14 or the like that may be required. Specifically, if the property is encumbered with a mortgage or another obligation in connection with which the property has been pledged to secure the obligation, then the mortgagee 16 may require that particular text be inserted into the issued insurance policy 12 as a mortgage clause 14, usually in a declarations page of the issued policy 12. As should be understood, the mortgagee 16 is the creditor or lender in a mortgage agreement in connection with the property, and thus receives periodic payments in connection with such mortgage agreement from a corresponding mortgagor that presumably requested the policy 12 from the insurance company 10.

As was set forth above, the mortgage clause 14 required by the mortgagee 16 essentially states that the mortgagee 16 is in fact a mortgagee with respect to the property and therefore has certain rights under the terms of the issued policy 12 with respect to the property. In particular, the mortgage clause 14 may have the correct legal name of the mortgagee 16, a designation that the mortgagee 16 should be construed to include successors and/or assignees, a correct legal address of the mortgagee 16, an identification of the mortgage, and/or the like. Note here that the identification of the mortgage will of course vary from policy 12 to policy 12. Note too that the information in a particular mortgage clause 14 as finalized in a particular policy 12 may also be employed to directly bill the mortgagee 16 for the cost of the policy 12, if in fact such an arrangement has been made, or otherwise notify the mortgagee 16 regarding the policy 12.

Figure 3:
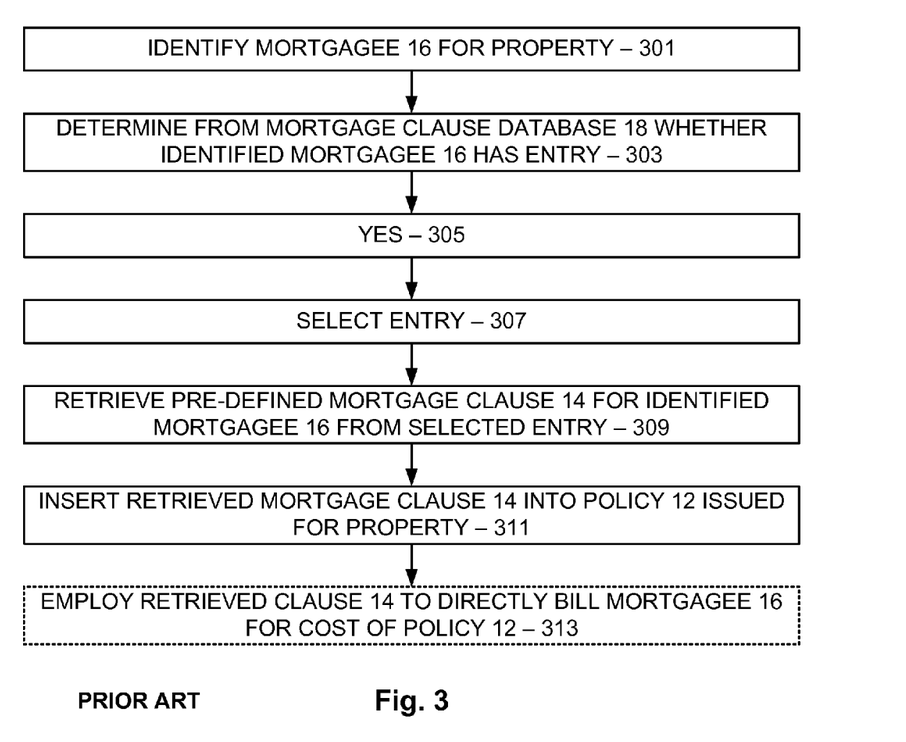
FIG. 3 is a flow diagram showing key actions performed in connection with the prior art system of FIG. 2.

Especially if particular mortgagees 16 are repeatedly referenced in the mortgage clauses 14 of policies 12 issued by a particular insurance company 10, the particular insurance company 10 may refer to a mortgage clause database 18 to obtain a particular mortgage clause 14 corresponding to a particular mortgagee 16. As was set forth above, such a mortgage clause database 18 would have therein multiple mortgage clauses 14, each for a particular mortgagee 16. Thus, and as seen in FIG. 3, issuance of a policy 12 by the particular insurance company 10 for a piece of property would include identifying the particular mortgagee 16 for such piece of property (301). Based on the identification, then, the insurance company 10 need not necessarily contact the identified mortgagee 16, but instead would refer to the mortgage clause database 18 to determine whether the identified mortgagee 16 has an appropriate entry therein (303). If so (305), the entry is selected (307) and a pre-defined mortgage clause 14 for the identified mortgagee 16 is retrieved from the selected entry (309) and appropriately inserted as inserted text into the policy 12 issued for the piece of property (311). Additionally, such retrieved clause 14 may also be employed to directly bill the mortgagee 16 for the cost of the policy 12 or otherwise notify the mortgagee 16 regarding the policy 12 (313).

In the prior art, and as was noted above, the mortgage clause database 18 was owned and maintained by the particular insurance company 10, and maintenance of such database 18 was perhaps not as thorough as possible. Thus, errors could accumulate in the database 18 in the form of entries that were out of date, multiple entries for the same mortgagee 16 without any distinguishing indicia, entries with information that was no longer correct, and the like. As may be appreciated, an entry would become incorrect or out of date if the information incumbent therein changed over the course of time, perhaps due to a change in the name, address, or legal form of the mortgagee 16, or the like. Similarly, multiple entries could arise if a second entry was created for a particular mortgagee 16 without deleting a first entry therefore, or if the mortgagee 16 specifies different mortgage clauses 14 for different jurisdictions, policy owners, or the like.

As a result, an operator selecting an entry as at 307 could select an entry with incorrect information, or be forced to choose incorrectly from among several entries for the mortgagee 16. In any case, use of an incorrect clause 14 will eventually be noted by the mortgagee 16 or an agent thereof, which in turn will require that the clause 14 be corrected. As should be understood, such correction requires considerable time and effort, both in human terms and in terms of paperwork, postage, filing, and the like. For example, such correction may require a telephone conversation with a policy agent or service representative or the like, after which the policy 12 is reissued and mailed with the corrected mortgage clause 14. While a single correction transaction may be insignificant, the correction may be required in thousands of policies 12, each of which would require a corresponding correction transaction.

Selecting Mortgage Clause from Third Party Database

It is to be appreciated that many mortgagees 16 employ third party vendors as tracking agents 20 to assist in tracking notifications and billings with respect to the insurance company 10. As should be understood, each tracking agent 20 acts as an agent for a mortgagee 16 and among other things verifies for that mortgagee 16 that policies 12 from the insurance company 12 with respect to the mortgagee 16 are correctly issued. Thus, among other things, such a tracking agent 20 ensures that each such policy 12 includes minimum coverage amounts, and that the mortgage clause 14 for the mortgagee 16 is in fact correct in such policy 12. Notably, if the mortgage clause 14 for the mortgagee 16 is in fact incorrect in such policy 12, the tracking agent 20 effectuates correcting same.

It is also to be appreciated that many insurance companies 10 that issue such property policies 12 employ third parties as notification agents 22 to assist in notifying mortgagees 16 of various information. As should be understood, each notification agent 22 acts as an agent of an insurance company 10 and among other things notifies mortgagees 16 when the insurance company 10 makes changes to policies 12 thereof regarding the mortgagees 16. For example, when each such policy 12 is issued or canceled, the notification agent 22 notifies the mortgagee 16 of such issuance or cancellation.

As was set forth above, a mortgage clause database 18 as owned and maintained by a particular insurance company 10 is usually not particularly well-maintained, perhaps because the particular insurance company 10 does not usually have the best information needed to populate and update such database 18 with current mortgage clauses 14 for corresponding mortgagees 16. At any rate, an insurance company 10 is likely not the best entity to own and maintain such a database 18, especially inasmuch as the insurance company 10 is not in the business of locating and keeping current such information on such mortgage clauses 14.

It would appear that a tracking agent 20 would be a better entity to own and maintain such a database 18, especially inasmuch as the tracking agent 20 is in fact in the business of locating and keeping current such information on such mortgage clauses 14. However, and notably, such a tracking agent 20 is typically an agent of a mortgagee 16 and not an insurance company 10, and accordingly a potential conflict would exist if an insurance company 10 were to employ a tracking agent 20 as an agent of such insurance company 10, especially when the tracking agent 20 is also an agent of a mortgagee 16. Put simply, such a tracking agent 20 would owe duties to both the insurance company 10 and the mortgagee 16 and the owed duties could potentially conflict with each other.

Figure 4:
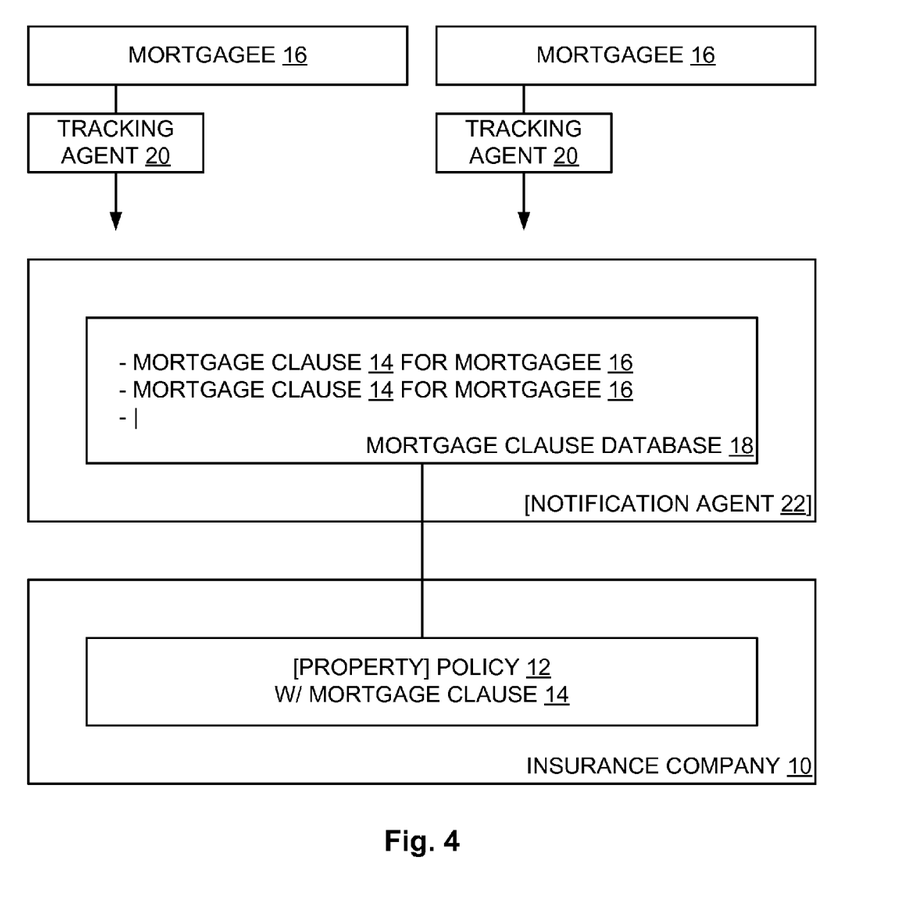
FIG. 4 is a block diagram showing a system for identifying a correct mortgage clause of a mortgagee for an insurance policy in accordance with various embodiments of the present innovation.

Accordingly, upon further reflection, and in various embodiments of the present innovation, a notification agent 22 would in fact be a better entity to own and maintain such a mortgage clause database 18*a*, as is shown in FIG. 4. Here, although the notification agent 20 is not in fact in the business of locating and keeping current such information on such mortgage clauses 14, the notification agent 20 is in the business of obtaining and providing information, and accordingly locating and keeping current such information on such mortgage clauses 14 in the database 18*a* would not be entirely foreign to such notification agent 20. Perhaps more significantly, such a notification agent 22 is typically an agent of an insurance company 10 and not a mortgagee 16, and accordingly no potential conflict would exist if an insurance company 10 were to employ a notification agent 22 as an agent of such insurance company 10, especially when the notification agent 22 traditionally fulfills such a role.

Figure 5:
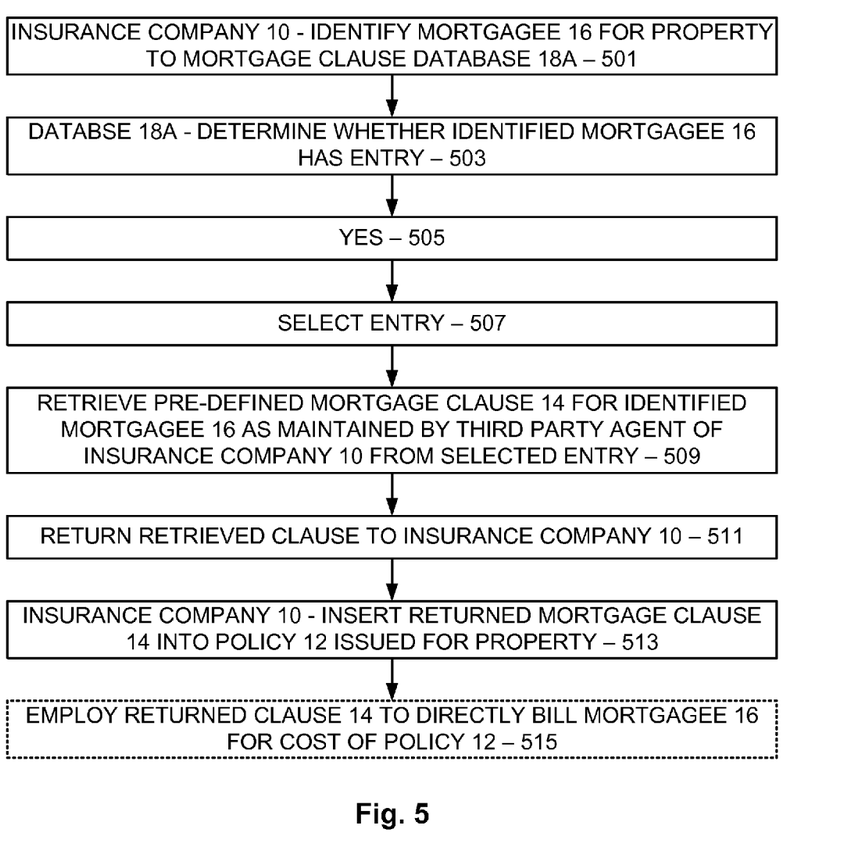
FIGS. 5 and 6 are flow diagram showing key actions performed in connection with the system of FIG. 4 in accordance with various embodiments of the present innovation.

With such a mortgage clause database 18*a* as maintained for the insurance company 10 by a third party such as a notification agent 22, then, issuing a policy 12 with a mortgage clause 14 may be performed in the manner shown in FIG. 5 in accordance with various embodiments of the present innovation. In particular, and turning now to FIG. 5, it is seen that obtaining a particular mortgage clause 14 corresponding to a particular mortgagee 16 may comprise identifying the particular mortgagee 16 for a piece of property to the database 18*a* (501). As may be appreciated, such identifying could be performed by a policy agent or service representative or the like (hereinafter, 'service representative') of the insurance company 10 for a customer, perhaps during a telephone or in-person conversation between such customer and representative. Alternatively, such identifying could be performed directly by the customer, perhaps in an on-line transaction with an inter-network site of the insurance company 10. At any rate, the identification would presumably be more reliable inasmuch as the information in the database 18*a* should be likewise more reliable.

Upon identifying the particular mortgagee 16 to the database 18*a* as at 501, the database 18*a* would then determine whether the identified mortgagee 16 has an appropriate entry therein (503). If so (505), the entry is selected (507) and a pre-defined mortgage clause 14 for the identified mortgagee 16 as maintained by the third party agent of the insurance company 10 is retrieved from the selected entry (509) and returned to the insurance company 10 (511), after which the insurance company 10 appropriately inserts same as inserted text into the policy 12 issued for the piece of property (513). Additionally, and as before, such retrieved clause 14 from the database 18*a* may also be employed to directly bill the mortgagee 16 for the cost of the policy 12 or otherwise notify the mortgagee 16 regarding the policy 12 (515).

Note here that the process as shown in FIG. 5 relies on a correct identification by a customer or a representative. As should be understood, such an identification by such customer or representative may not be necessary or even advisable. For one thing, such an identification may still be incorrect. For another, the identification even if correct may not be acceptable in certain circumstances.

With regard to the latter, it is to be understood that issuing a policy 12 such as in connection with the various embodiments of the present innovation is often performed in connection with settlement of the purchase or the like of the property for which the policy 12 is issued, and that such settlement may be performed by a settlement office or the like who has been previously informed of a supposedly correct mortgage clause 14. Notably, such supposedly correct mortgage clause 14 is actually wrong, but the settlement officer cannot allow settlement to proceed without issuance of a policy 12 for the property with the supposedly correct but actually wrong mortgage clause 14. Thus, it may actually be necessary to issue the policy 12 with an incorrect mortgage clause 14.

Figure 6:
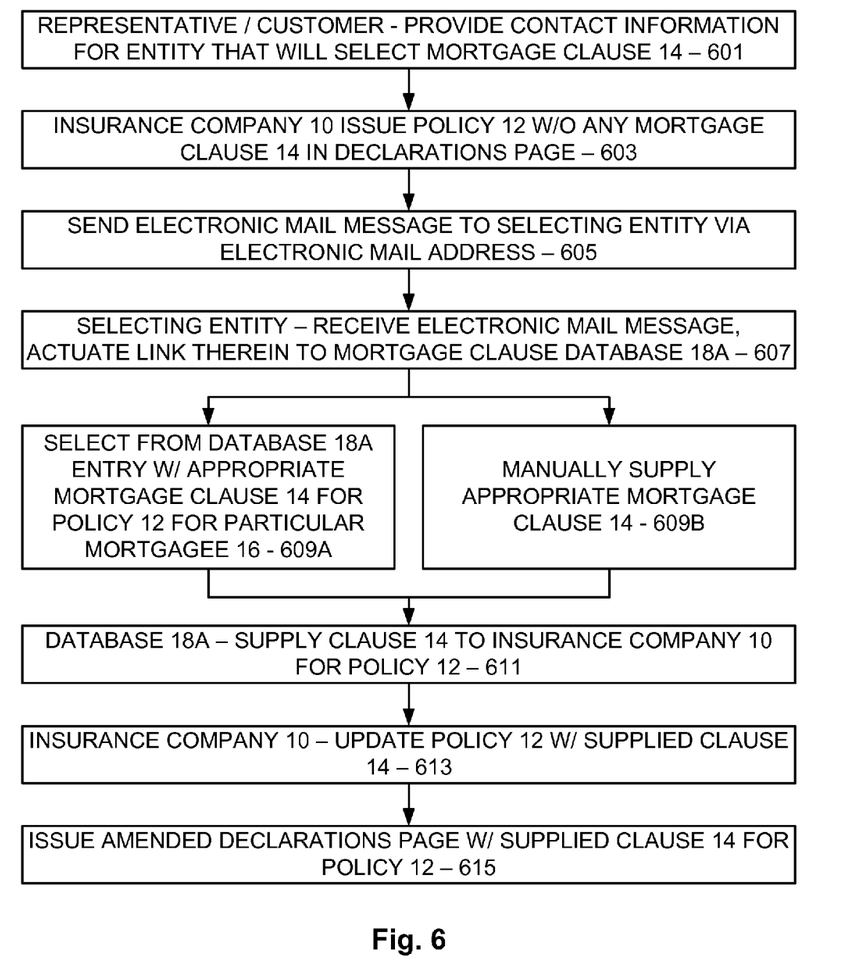

Accordingly, and turning now to FIG. 6, a process is provided to issue a policy 12 without a correct identification of a mortgage clause 14 in accordance with various embodiments of the present innovation. In pertinent part, a policy service representative or the like of the insurance company 10 or else the customer does not identify the particular mortgagee 16 for a piece of property and does not contact the database 18a. Instead, the representative or customer provides contact information for an entity that will select the mortgage clause 14 (601). Such contact information should include an electronic mail address or the like for the selecting entity.

Thereafter, the policy 12 is issued without any mortgage clause 14 in a declarations page thereof (603), and thereafter the electronic mail address for the selecting entity is employed to send an electronic mail message to same (605). Note here that the selecting entity may be any appropriate entity without departing from the spirit and scope of the present innovation. For example, the selecting entity may be a person or an automated service at the mortgagee 16 for the property, or for an agent of such mortgagee 16. Such selecting entity may even be the aforementioned settlement officer.

Upon receiving the sent electronic mail message, the selecting entity opens same and actuates a link or other accessing device (hereinafter, 'link') within the message (607). In various embodiments of the present innovation, and as should now be appreciated, the actuated link directs the selecting entity to the mortgage clause database 18a where the selecting entity may then select from such database 18a an entry having the appropriate mortgage clause 14 for the policy 12 for the particular mortgagee 16 (609a). Presumably, the selecting entity is aware of the particular mortgagee 16 and the appropriate mortgage clause 14 thereof for the policy 12. Alternately, if the appropriate mortgage clause 14 is not in the database 18a, the selecting entity may manually supply the appropriate mortgage clause 14 (609b).

In either case, the selected clause 14 is then supplied by the database 18a to the insurance company 10 in connection with the policy 12 (611), the insurance company updates the policy 12 with the supplied clause 14 (613), and an amended declarations page with the supplied clause 14 is then issued for the policy 12 (615). Note here that the amended declarations page may be sent to the customer, to a settlement officer if necessary, or to another appropriate person or location by regular or electronic mail. Note too that in the case where the amended declarations page contains an incorrect mortgage clause 14 as manually entered by a settlement officer, the incorrect mortgage clause 14 may be corrected at a later time by a tracking agent 20 for the mortgagee 16, or may be corrected by an administrator of the database 18a who would be flagged to investigate the manually entered mortgage clause 14.

Significantly, the process as set forth in FIG. 6 may be initiated by a policy service representative of the insurance company 10 for a customer, perhaps during a telephone or in-person conversation between such customer and representative. Alternatively, such identifying could be performed directly by the customer, perhaps in an on-line transaction with an inter-network site of the insurance company 10.

At any rate, the selection of the mortgage clause 14 at 609a according to the process of FIG. 6 would presumably be more reliable, inasmuch as the selection of the clause 14 from the database 18a is performed by a selecting entity that presumably has better knowledge as to which clause 14 to select from such database 18a. Put simply, the identification of the correct mortgage clause 14 is performed by or on behalf of the mortgagee 16 which ought to know the correct mortgage clause 14, and not by or on behalf of the insurance company 10 or the customer, and thus the insurance company 10 need not deal with correcting as many errors in connection with such mortgage clause 14. Of course, the manual entry of such clause at 609b is less reliable, but nevertheless may be necessary such as for example in the situation set forth above regarding the settlement officer who cannot allow settlement to proceed without issuance of a policy 12 for the property with a supposedly correct but actually wrong mortgage clause 14.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for selecting the correct clause for a document, and specifically the correct mortgage clause 14 to be inserted into an insurance policy 12. Such selection of the correct clause 14 is from a third party database 18a that is better maintained than the mortgage clause database 18 as maintained by an insurance company 10, and can be performed by an entity related to the mortgagee 16, which ought to be better able to select the correct clause 14.

It should be appreciated that changes could be made to the embodiments described above without departing from the innovative concepts thereof. For example although the various embodiments of the present innovation are primarily set forth above in terms of a mortgage clause 14 for an insurance policy 12 for property, such innovation may also be employed in any type of encumbrance clause in connection with any other insurance policy 12, such as for example a collateral clause in an automobile insurance policy 12, or for that matter in connection with any other clause to be inserted in any other document. It should be understood, therefore, that this innovation is not limited to the particular embodiments disclosed, but it is intended to cover modifications within the spirit and scope of the present innovation as defined by the appended claims.

The invention claimed is:

1. A computing system implemented method performed by an insurance company for issuing a property policy of the insurance company to a customer for property of the customer, the property being encumbered with an obligation to a creditor in connection with which the property is pledged to secure the obligation, the policy to be issued to include an encumbrance clause as specified by the creditor, the method comprising:

providing, with the computing system, an identification of the creditor to a clause database owned and maintained by a third party notification agent of the insurance company, the clause database of the third party notification agent determining that the identified creditor has an entry therein, retrieving from the entry the encumbrance clause as specified by the creditor, and returning the retrieved clause;

receiving the retrieved clause for the identified creditor from the clause database with the computing system;

inserting the received clause for the identified creditor into the policy to be issued with the computing system;

issuing the policy with the inserted encumbrance clause for the identified creditor to the customer with the computing system; and     directly billing the customer for the issued policy based on the inserted encumbrance clause with the computing system,     wherein the third party notification agent of the insurance company maintains and keeps current the clause database with the computing system.

2. The computing system implemented method of claim 1 wherein the property is mortgaged property, the creditor is a mortgagee, and the encumbrance clause is a mortgage clause.

3. The computing system implemented method of claim 1 wherein the property is an automobile, the creditor provides a loan to the customer with the automobile as collateral for the loan, and the encumbrance clause is a collateral clause.

4. The computing system implemented method of claim 1 wherein the identification of the creditor is received from one of a representative of the insurance company in consultation with the customer and the customer during an on-line transaction with an inter-network site of the insurance company.

5. The computing system implemented method of claim 1 wherein the received encumbrance clause is also employed to notify the mortgagee regarding the policy or otherwise notify the creditor regarding the policy.

6. The computing system implemented method of claim 1 wherein the clause database has a plurality of entries therein, each entry including an identification of one of a plurality of creditors and a corresponding encumbrance clause.

7. A tangible computer-readable storage medium having thereon computer-executable instructions, which when executed by the computer, cause the computer to implement a method for issuing a property policy of an insurance company to a customer for property of the customer, the property being encumbered with an obligation to a creditor in connection with which the property is pledged to secure the obligation, the policy to be issued to include an encumbrance clause as specified by the creditor, the method comprising:

providing an identification of the creditor to a clause database owned and maintained by a third party notification agent of the insurance company, the clause database of the third party notification agent determining that the identified creditor has an entry therein, retrieving from the entry the encumbrance clause as specified by the creditor, and returning the retrieved clause;

receiving the retrieved clause for the identified creditor from the clause database;

inserting the received clause for the identified creditor into the policy to be issued;

issuing the policy with the inserted encumbrance clause for the identified creditor to the customer; and     directly billing the customer for the issued policy based on the inserted encumbrance clause,     wherein the third party notification agent of the insurance maintains and keeps current the clause database.

8. The tangible medium of claim 7 wherein the property is mortgaged property, the creditor is a mortgagee, and the encumbrance clause is a mortgage clause.

9. The tangible medium of claim 7 wherein the property is an automobile, the creditor provides a loan to the customer with the automobile as collateral for the loan, and the encumbrance clause is a collateral clause.

10. The tangible medium of claim 7 wherein the identification of the creditor is received from one of a representative of the insurance company in consultation with the customer and the customer during an on-line transaction with an inter-network site of the insurance company.

11. The tangible medium of claim 7 wherein the received encumbrance clause is also employed to notify the mortgagee regarding the policy or otherwise notify the mortgagee regarding the policy.

12. The tangible medium of claim 7 wherein the clause database has a plurality of entries therein, each entry including an identification of one of a plurality of creditors and a corresponding encumbrance clause.

13. A computing system employed by an insurance company for issuing a property policy of the insurance company to a customer for property of the customer, the property being encumbered with an obligation to a creditor in connection with which the property is pledged to secure the obligation, the policy to be issued to include an encumbrance clause as specified by the creditor, the system comprising:

a processor; and a memory storage device coupled to the processor and storing instructions, which when executed by the processor, cause the processor to:

provide an identification of the creditor to a clause database owned and maintained by a third party notification agent of the insurance company, the clause database of the third party notification agent determining that the identified creditor has an entry therein, retrieving from the entry the encumbrance clause as specified by the creditor, and returning the retrieved clause;

receive the retrieved clause for the identified creditor from the clause database;

insert the received clause for the identified creditor into the policy to be issued;

issue the policy with the inserted encumbrance clause for the identified creditor to the customer; and         directly bill the customer for the issued policy based on the inserted encumbrance clause,         wherein the third party notification agent of the insurance company maintains and keeps current the clause database.

14. The computing system of claim 13 wherein the property is mortgaged property, the creditor is a mortgagee, and the encumbrance clause is a mortgage clause.

15. The computing system of claim 13 wherein the property is an automobile, the creditor provides a loan to the customer with the automobile as collateral for the loan, and the encumbrance clause is a collateral clause.

16. The computing system of claim 13 wherein the identification of the creditor is received from one of a representative of the insurance company in consultation with the customer and the customer during an on-line transaction with an internetwork site of the insurance company.

17. The computing system of claim 13 wherein the received encumbrance clause is also employed to notify the mortgagee regarding the policy or otherwise notify the mortgagee regarding the policy.

18. The computing system of claim 13 wherein the clause database has a plurality of entries therein, each entry including an identification of one of a plurality of creditors and a corresponding encumbrance clause.

* * * * *